(12) United States Patent
Sumi et al.

(10) Patent No.: US 12,545,633 B2
(45) Date of Patent: Feb. 10, 2026

(54) METHOD FOR PRODUCING FLUORENONE

(71) Applicant: MITSUBISHI GAS CHEMICAL COMPANY, INC., Chiyoda-ku (JP)

(72) Inventors: Hiroki Sumi, Okayama (JP); Yuki Watanabe, Okayama (JP); Hideaki Fujita, Okayama (JP); Goh Nakamura, Okayama (JP); Tatsuyuki Kumano, Okayama (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 487 days.

(21) Appl. No.: 18/249,179

(22) PCT Filed: Oct. 21, 2021

(86) PCT No.: PCT/JP2021/038851
§ 371 (c)(1),
(2) Date: Apr. 14, 2023

(87) PCT Pub. No.: WO2022/085746
PCT Pub. Date: Apr. 28, 2022

(65) Prior Publication Data
US 2023/0391705 A1    Dec. 7, 2023

(30) Foreign Application Priority Data

Oct. 23, 2020 (JP) .................... 2020-178094

(51) Int. Cl.
C07C 49/675 (2006.01)
C07C 45/36 (2006.01)
C07C 45/82 (2006.01)

(52) U.S. Cl.
CPC ............ *C07C 49/675* (2013.01); *C07C 45/36* (2013.01); *C07C 45/82* (2013.01); *C07C 2603/18* (2017.05)

(58) Field of Classification Search
CPC ....... C07C 45/36; C07C 45/82; C07C 49/675; C07C 2603/18; B01J 31/04
See application file for complete search history.

(56) References Cited

U.S. PATENT DOCUMENTS

| | | | |
|---|---|---|---|
| 2,859,247 A | 11/1958 | Radzitzky et al. | |
| 3,038,940 A * | 6/1962 | Serres, Jr. ............... | C07C 45/36 568/321 |
| 3,875,237 A | 4/1975 | Niznik | |
| 4,477,380 A | 10/1984 | Knips et al. | |
| 6,403,521 B1 | 6/2002 | Ishii et al. | |
| 2002/0169331 A1 | 11/2002 | Miura et al. | |

FOREIGN PATENT DOCUMENTS

| | | | |
|---|---|---|---|
| CN | 110002986 A | 7/2019 | |
| JP | 58-500525 A | 4/1983 | |
| JP | 2001-288122 A | 10/2001 | |
| JP | 2004115390 A * | 4/2004 | ............ C07C 45/80 |
| JP | 2007-182399 A | 7/2007 | |

OTHER PUBLICATIONS

Krapcho et al., "Product Subclass 3: Sodium Halides and Sodium Cyanide", Science of Synthesis, vol. 8B, Category 1, pp. 925-1010 (Total 88 pages), XP 009516409.

* cited by examiner

*Primary Examiner* — Yate' K Cutliff
(74) *Attorney, Agent, or Firm* — Oblon, McClelland, Maier & Neustadt, L.L.P.

(57) ABSTRACT

Provided is a method for producing fluorenone comprising an oxidation step of oxidizing fluorene in the presence of an aliphatic carboxylic acid having 2 to 3 carbon atoms, a metal catalyst, a bromine compound, and oxygen, a solvent removal step of removing the aliphatic carboxylic acid, a heating step at 120 to 350° C., and a distillation step in the order indicated.

20 Claims, No Drawings

METHOD FOR PRODUCING FLUORENONE

CROSS-REFERENCE TO RELATED APPLICATIONS

The present application is a 35 U.S.C. § 371 National Stage Application of International Patent Application PCT/JP2021/038851, filed Oct. 21, 2021, which is based on and claims the benefit of priority to Japanese Application No. 2020-178094, filed Oct. 23, 2020. The entire contents of these applications are incorporated herein by reference.

TECHNICAL FIELD

The present invention relates to a method for producing fluorenone.

BACKGROUND ART

Fluorenone is used as a starting material or intermediate for chemicals, resins, etc. Specifically, fluorenone is a very useful compound as a starting material for electrophotographic photoreceptors, a starting material for colors, and a starting material for optical resins.

As a method for producing fluorenone, a method of oxidizing fluorene is performed. In particular, a production method by liquid phase oxidation using an oxygen-containing gas such as air has been developed.

For example, in PTL1, for the purpose of producing fluorenones at a high yield, a method for producing fluorenones including oxidizing fluorenes with molecular oxygen in an organic solvent in the presence of a phase transfer catalyst and a solid alkali metal hydroxide is disclosed.

Further, in PTL2, for the purpose of producing fluorenone at a high yield, a method of reacting a dimethyl sulfoxide solution of fluorene with oxygen molecules in the presence of a small amount of alkali metal hydroxide is disclosed.

In PTL3, for the purpose of easily and economically producing diallyl ketone at a high yield, a method of reacting an aromatic compound with oxygen molecules to produce a diallyl ketone using a lower saturated aliphatic monocarboxylic acid as solvent and a heavy metal as oxidation catalyst is disclosed, and a method for producing fluorenone is disclosed as an example thereof.

CITATION LIST

Patent Literature

PTL1: JP 2007-182399 A
PTL2: U.S. Pat. No. 3,875,237 B
PTL3: U.S. Pat. No. 3,038,940 B

SUMMARY OF INVENTION

Technical Problem

According to PTL3, fluorenone is synthesized by the so-called Amoco MC method, and a product is obtained at a yield of 76%. According to PTL3, in order to remove by-products as impurities, fluorenone is further recrystallized from benzene and hexane for purification of fluorenone, though it has been difficult to produce a high-purity fluorenone. Further, the method has been difficult for use in industrial production. That is, it has been difficult to continuously produce high-purity fluorenone in large quantities.

Therefore, it is an object of the present invention to provide a production method capable of efficiently removing by-products generated by oxidation reaction and industrially providing high-purity fluorenone.

Solution to Problem

As a result of extensive study by the present inventors, it has been found that the problem can be solved by oxidizing fluorene in the presence of a specific solvent, a metal catalyst and a bromine compound, removing the solvent, heating at a specific temperature, and performing distillation.

The present invention relates to the following items [1] to [7].

[1] A method for producing fluorenone comprising an oxidation step of oxidizing fluorene in the presence of an aliphatic carboxylic acid having 2 to 3 carbon atoms, a metal catalyst, a bromine compound, and oxygen, a solvent removal step of removing the aliphatic carboxylic acid, a heating step at 120 to 350° C., and a distillation step in the order indicated.

[2] The method for producing fluorenone according to the item [1], wherein the heating time in the heating step is 5 minutes or more.

[3] The method for producing fluorenone according to item [1] or [2], wherein the mixture subjected to the heating step comprises fluorenone and bromide ions, wherein a concentration of the bromide ions in the heating step is 0.01 to 5 parts by mass relative to 100 parts by mass of fluorenone.

[4] The method for producing fluorenone according to any one of items [1] to [3], wherein the distillation step comprises a step of removing high boiling point components and a step of removing low boiling point components in the order indicated.

[5] The method for producing fluorenone according to any one of items [1] to [4], wherein the metal catalyst is at least one selected from the group consisting of a cobalt catalyst, a manganese catalyst, a zirconium catalyst, a cerium catalyst, and a nickel catalyst.

[6] The method for producing fluorenone according to any one of items [1] to [5], wherein the aliphatic carboxylic acid is acetic acid.

[7] The method for producing fluorenone according to any one of items [1] to [6], wherein oxygen is supplied by introducing air in the oxidation step.

Advantageous Effects of Invention

According to the present production method, by-products generated by the oxidation reaction can be efficiently removed, and high-purity fluorenone can be industrially produced.

DESCRIPTION OF EMBODIMENTS

A method for producing fluorenone of the present invention comprises an oxidation step of oxidizing fluorene in the presence of an aliphatic carboxylic acid having 2 to 3 carbon atoms, a metal catalyst, a bromine compound, and oxygen, a solvent removal step of removing the aliphatic carboxylic acid, a heating step at 120 to 350° C., and a distillation step in the order indicated.

The production method of the present invention is described in detail as follows.

[Oxidation Step]

In the method for producing fluorenone of the present invention, first, fluorene is oxidized. By the oxidation step, fluorene can be oxidized to produce fluorenone as a main product.

In the oxidation step in the method for producing fluorenone of the present invention, fluorenone is oxidized in the presence of an aliphatic carboxylic acid having 2 to 3 carbon atoms, a metal catalyst, a bromine compound, and oxygen, so that an oxidation reaction mixture containing fluorenone as a main product is obtained.

<Aliphatic Carboxylic Acid Having 2 to 3 Carbon Atoms>

The aliphatic carboxylic acid used in the present step is an aliphatic carboxylic acid having 2 to 3 carbon atoms, and more preferably an aliphatic carboxylic acid having 2 carbon atoms.

Preferably, specific examples of the aliphatic carboxylic acid include at least one selected from the group consisting of acetic acid and propionic acid, and acetic acid is more preferred. In the case of using acetic acid, water and acetic acid may be mixed to prepare a mixed solution in advance for use as described later, or only acetic acid may be used.

It is preferable to use the aliphatic carboxylic acid because the activity of the catalyst may be enhanced.

The amount of the aliphatic carboxylic acid used in the oxidation step is preferably 10 to 1000 parts by mass, more preferably 50 to 400 parts by mass, still more preferably 70 to 200 parts by mass, and furthermore preferably 80 to 100 parts by mass relative to 100 parts by mass of fluorene.

With an amount of the aliphatic carboxylic acid equal to or more than the lower limit, the viscosity may be made appropriate for easy handling, and the heat of reaction may be controlled to prevent the reactor temperature from rising. Further, with an amount of the aliphatic carboxylic acid equal to or less than the upper limit, the production efficiency is excellent and the economy is also excellent.

One aliphatic carboxylic acid may be used alone, or two or more may be used in combination.

<Metal Catalyst>

The metal catalyst used in the present step is preferably at least one selected from the group consisting of a transition metal catalyst and a rare earth metal catalyst, more preferably a transition metal catalyst.

Preferably, examples of the specific transition metal catalyst include at least one selected from the group consisting of a cobalt catalyst, a manganese catalyst, a zirconium catalyst, a cerium catalyst, and a nickel catalyst, and more preferably, examples thereof include at least one selected from the group consisting of a cobalt catalyst and a manganese catalyst. Still more preferably, both of a cobalt catalyst and a manganese catalyst are used.

As described above, the specific metal catalyst used in the present step is preferably at least one selected from the group consisting of a cobalt catalyst, a manganese catalyst, a zirconium catalyst, a cerium catalyst, and a nickel catalyst, and more preferably at least one selected from the group consisting of a cobalt catalyst and a manganese catalyst. Still more preferably, both of a cobalt catalyst and a manganese catalyst are used.

A metal catalyst may be used in the form of a salt, an elemental metal, an oxide, a hydroxide, or the like. The metal catalyst used in the present step is preferably a salt, more preferably an aliphatic carboxylate, still more preferably a lower aliphatic carboxylate, and furthermore preferably an acetate. In particular, at least one selected from the group consisting of cobalt acetate and manganese acetate is furthermore preferred.

It is preferable to use the metal catalyst, because fluorenone can be obtained at a high yield.

The amount of the metal catalyst used in the oxidation step in terms of metal elements is preferably 0.02 to 10 parts by mass, more preferably 0.05 to 5 parts by mass, still more preferably 0.1 to 3 parts by mass, and furthermore preferably 0.1 to 1 part by mass, relative to 100 parts by mass of fluorene.

With a catalyst concentration equal to or more than the lower limit, the reaction rate is improved and the yield is also improved. With a catalyst concentration equal to or less than the upper limit, the catalyst cost is reduced and the reaction is not adversely affected.

One metal catalyst may be used alone, or two or more may be used in combination.

<Bromine Compound>

Examples of the bromine compound used in the present step preferably include hydrogen bromide, a bromide salt, and an organic bromine compound, more preferably include at least one selected from the group consisting of hydrogen bromide and a bromide salt, and still more preferably include hydrogen bromide.

Hydrogen bromide is preferably used as an aqueous solution.

Specific examples of the bromide salt include sodium bromide, potassium bromide, and ammonium bromide.

The amount of the bromine compound in terms of bromine used in the oxidation step is preferably 0.01 to 5 parts by mass, more preferably 0.05 to 3 parts by mass, still more preferably 0.05 to 1 part by mass, and furthermore preferably 0.05 to 0.5 parts by mass, relative to 100 parts by mass of fluorene.

With an amount of the bromine compound equal to or more than the lower limit of the range, the reaction rate is improved and the yield is also improved. With an amount of the bromine compound equal to or less than the upper limit of the range, corrosion is hardly caused and an apparatus made of high-grade material is unnecessary.

One bromine compound may be used alone, or two or more may be used in combination.

<Water>

Water may be used in the present step. It is preferable to use water because a bromine compound is easily dissolved.

The amount of water used in the oxidation step is preferably 1 to 200 parts by mass, more preferably 1 to 100 parts by mass, still more preferably 2 to 50 parts by mass, and furthermore preferably 3 to 10 parts by mass, relative to 100 parts by mass of fluorene.

With a water concentration in the range, the bromine compound may be dissolved while preventing the catalytic activity from being lowered, so that the yield of fluorenone may be improved.

<Oxygen>

As the oxygen used in the present step, oxygen gas may be used, or a mixed gas with an inert gas or the like may be used. In particular, in the present step, it is preferable that oxygen be supplied by introducing air from the viewpoint of safety and economy.

The oxygen used in the present step is introduced such that the oxygen concentration in the exhaust gas (off-gas) discharged from a reactor during supply of starting materials is preferably 0.1 to 8 vol %, more preferably 1 to 5 vol %.

With an introduced amount of oxygen maintained within the range, the reaction may be performed safely and efficiently in a preferred manner below an explosion range of the solvent.

<Conditions for Oxidation Step>

The temperature during the oxidation reaction in the present step is preferably 120 to 280° C., more preferably 160 to 260° C., and even more preferably 190 to 240° C.

With a temperature during the oxidation reaction equal to or more than the lower limit of the range, the reaction rate is improved, and with a temperature during the oxidation reaction equal to or less than the upper limit of the range, formation of by-products is suppressed to improve the yield.

The pressure during the oxidation reaction in the present step may be in a pressure range that allows the reaction solution to be kept in the liquid phase, and is preferably 0.1 to 4 MPa.

The reaction time of the oxidation reaction in the present step is preferably 0.1 to 10 hours, more preferably 0.5 to 5 hours, and still more preferably 1 to 3 hours in the case where oxygen is supplied by introducing air.

In the present step, from the viewpoint of safety, it is preferable to introduce an inert gas such as nitrogen into a reaction container containing the starting materials before introducing oxygen.

[Solvent Removal Step]

The method for producing fluorenone of the present invention includes a solvent removal step of removing aliphatic carboxylic acids having 2 to 3 carbon atoms after the oxidation step.

In the solvent removal step in the method for producing fluorenone of the present invention, the aliphatic carboxylic acids having 2 to 3 carbon atoms are removed from the oxidation reaction mixture obtained in the oxidation step to produce a mixture containing fluorenone as a main component.

In the case where water is used in the oxidation reaction step, water may also be removed in the present step.

In the present step, in order to increase the production efficiency, the solvent may be removed by heat distillation under reduced pressure, or the solvent may be removed by heat distillation under atmospheric pressure.

The pressure during removal of solvent in the present step is preferably 80 kPa or less, more preferably 1 to 60 kPa, and still more preferably 2 to 50 kPa.

The temperature during removal of solvent in the present step is preferably 80 to 200° C., more preferably 90 to 180° C., and still more preferably 100 to 150° C.

In the present step, an apparatus used for general heat distillation is used, and specific examples thereof include a simple distillation apparatus, a precision distillation apparatus, a molecular distillation apparatus, and a thin film distillation apparatus. Other than these distillation apparatuses, the solvent may be removed by using a dryer or the like.

The present step is a step of controlling the amount of residual aliphatic carboxylic acids having 2 to 3 carbon atoms to preferably 5 mass % or less in the mixture obtained after the present step, more preferably 3 mass % or less, and still more preferably 1 mass % or less. In the present step, the aliphatic carboxylic acids having 2 to 3 carbon atoms may be completely removed. By removing the solvent by the present step, impurities can be efficiently removed probably due to improvement in the reaction rate of by-products in the heating step in the latter stage, so that high-purity fluorenone can be obtained in a preferred manner.

[Heating Step]

The method for producing fluorenone of the present invention includes a heating step at 120 to 350° C. after the solvent removal step.

The heating step in the method for producing fluorenone of the present invention includes heating the mixture containing fluorenone as a main component obtained in the solvent removal step at 120 to 350° C. to obtain a heat-treated mixture.

The present step may be performed by any method such as heating in the container used in the solvent removal step, heating in a container separately prepared for use in the heating step, and heating in a distillation apparatus for use in the distillation step as the next step. Any of the methods which allows the mixture to be heated at 120 to 350° C. may be employed, and on an as needed basis, the mixture containing fluorenone as a main component may be refluxed under reduced pressure.

In the present invention, the reason why provision of the heating step allows impurities such as by-products generated by the oxidation reaction to be efficiently removed for industrial production of high-purity fluorenone is presumed as follows, though not being clear.

It is presumed that the by-products and the like are changed into compounds having a boiling point significantly different from that of fluorenone as target product by the heating step, so that the compounds can be efficiently removed in the subsequent distillation step. In particular, although an aliphatic carboxylic acid fluorenyl ester as the main by-product is difficult to be removed by mere distillation due to having a boiling point close to that of fluorenone as target, provision of a heating step after completion of the oxidation reaction probably allows the aliphatic carboxylic acid fluorenyl ester to be decomposed and polymerized into a high molecular weight polymer, which can be efficiently removed in the subsequent distillation step, so that a high-purity fluorenone can be obtained by distillation as an industrial method.

The temperature during heating in the present step is 120 to 350° C., preferably 180 to 280° C., more preferably 220 to 280° C., still more preferably 220 or more and less than 260° C., and furthermore preferably 240° C. or more and less than 260° C.

In the present step, it is preferable that the mixture subjected to the heating step contain bromide ions during heating. It is presumed that inclusion of bromide ions allows the decomposition and polymerization of the carboxylic acid fluorenyl ester to be accelerated. Addition of bromide ions is not required in the case where the bromine compound used in the oxidation step remains in the present step. However, in the case where the concentration is reduced through removal or discharge in the oxidation step and the solvent removal step, addition of bromide ions is preferred. The addition allows the concentration to be adjusted to a suitable level.

The mixture subjected to the present step is a mixture containing fluorenone obtained in the solvent removal step as a main component. That is, in the present heating step, the mixture subjected to the heating step contains fluorenone and bromide ions, and the bromide ion concentration in the present heating step is preferably 0.01 to 5 parts by mass, more preferably 0.05 to 3 parts by mass, still more preferably 0.05 to 1 part by mass, furthermore preferably 0.05 to 0.5 parts by mass, and furthermore preferably 0.1 to 0.4 parts by mass relative to 100 parts by mass of fluorenone.

In the present step, as the bromine compound that provides bromide ions, the same one as used in the oxidation step may be suitably used. Specifically, preferred examples include hydrogen bromide, a bromide salt, and an organic bromine compound, more preferred examples include at least one selected from the group consisting of hydrogen bromide and a bromide salt, and still more preferred examples include hydrogen bromide.

Specific examples of the bromide salt include sodium bromide, potassium bromide, and ammonium bromide.

Further, in the present step, it is preferable to use a metal catalyst. As the metal catalyst, it is convenient and preferable to use the one used in the oxidation step, which is the previous step, as it is.

The metal catalyst suitably used in the present step is preferably the same one as used in the oxidation step, and specifically, preferred examples include at least one selected from the group consisting of a cobalt catalyst, a manganese catalyst, a zirconium catalyst, a cerium catalyst, and a nickel catalyst, and more preferred examples include at least one selected from the group consisting of a cobalt catalyst and a manganese catalyst. It is still more preferable to use both a cobalt catalyst and a manganese catalyst.

The metal catalyst may be used in the form of a salt, an elemental metal, an oxide, a hydroxide, or the like. The metal catalyst used in the present step is preferably a salt, more preferably an aliphatic carboxylate, still more preferably a lower aliphatic carboxylate, and furthermore preferably an acetate. In particular, at least one selected from the group consisting of cobalt acetate and manganese acetate is furthermore preferred.

It is presumed that use of the metal catalyst described above accelerates the decomposition and polymerization of the carboxylic acid fluorenyl ester.

The amount of the metal catalyst used in the heating step may be an amount determined for use of the same one used in the oxidation step as it is, and is preferably 0.02 to 10 parts by mass, more preferably 0.05 to 5 parts by mass, still more preferably 0.1 to 3 parts by mass, and furthermore preferably 0.1 to 1 part by mass in terms of elemental metal relative to 100 parts by mass of fluorene used as starting material in the oxidation step.

Usually, in order to prevent deterioration of the target product, heating is not performed in the presence of a catalyst after completion of the reaction. However, in the production method of the present invention, after completion of the oxidation reaction and removal of solvent, heating is performed in the presence of the metal catalyst and bromide ions, so that by-products and the like can be efficiently removed in the subsequent distillation step and high-purity fluorenone can be industrially produced.

The heating time in the present heating step is preferably 5 minutes or more, more preferably 10 minutes or more, still more preferably 20 minutes to 100 hours, furthermore preferably 30 minutes to 20 hours, and furthermore preferably 1 to 10 hours. It is preferable that the heating time be appropriately adjusted corresponding to the heating temperature and the concentration of bromide ions. In the case where the heating temperature is high or the bromide ion concentration is high, the effect of the present invention may be exhibited even in a short heating time. Further, in the case where the heating temperature is high and the bromide ion concentration is high, the effect of the present invention may be exhibited even in a shorter heating time.

Although the purity of the target fluorenone may be further increased by lengthening the heating time, the target fluorenone is deteriorated by long-term heating. Accordingly, from the viewpoint of preventing the deterioration of fluorenone and improving the yield of fluorenone, it is preferable to determine the end point of heating.

As a specific example, in the case where the bromide ion concentration is adjusted to 0.1 to 0.4 parts by mass relative to 100 parts by mass of fluorenone and the heating temperature is set to 150° C. or more and less than 220° C., the heating time is preferably 15 minutes to 10 hours, more preferably 1 to 7 hours, and still more preferably 2 to 5 hours.

In the case where the bromide ion concentration is adjusted to 0.1 to 0.4 parts by mass relative to 100 parts by mass of fluorenone and the heating temperature is set to 220° C. or more and less than 260° C., the heating time is preferably 5 minutes to 3 hours, more preferably 15 minutes to 2 hours, and still more preferably 45 minutes to 1.5 hours.

In the case where the bromide ion concentration is adjusted to 0.1 to 0.4 parts by mass relative to 100 parts by mass of fluorenone and the heating temperature is set to 260° C. or more and less than 300° C., the heating time is preferably 5 minutes to 1 hour, more preferably 5 to 45 minutes, and still more preferably 10 to 30 minutes.

In the case where the bromide ion concentration is adjusted to 0.1 to 0.4 parts by mass relative to 100 parts by mass of fluorenone and the heating temperature is set to 300 to 320° C., the heating time is preferably 5 to 30 minutes, more preferably 5 to 15 minutes.

[Distillation Step]

The method for producing fluorenone of the present invention includes a distillation step after the heating step.

The distillation step in the method for producing fluorenone of the present invention may be any method as long as the target fluorenone may be separated and collected. It is preferable that the distillation step include a step of removing high boiling point components and a step of removing low boiling point components. It is more preferable that the distillation step include a step of removing high boiling point components and a step of removing low boiling point components in the order indicated.

Further, in the step of removing low boiling components using a distillation column, in the case where the residence time is long at the column bottom, fluorenone may be deteriorated and colored, so it is preferable to further include a step of removing a coloring component.

The two-step distillation, which is a preferred embodiment, will be described below.

(High Boiling Point Component Removal Step)

First, it is preferable to remove high boiling point components. It is presumed that the high boiling point components contain various impurities and by-products, and by removing the high boiling point components at the beginning of the distillation step, it is presumed that deterioration of the target product and the increase of impurities due to decomposition of the high boiling point components may be suppressed.

The distillation temperature may be appropriately adjusted to about the boiling point of fluorenone under the pressure during distillation (boiling point at 1 atm is 342° C.). For example, in the case where the distillation pressure is adjusted to 1.5 to 3.5 kPa, the distillation temperature is preferably 150 to 300° C., more preferably 160 to 250° C., still more preferably 170 to 240° C., and furthermore preferably 180 to 220° C.

In the case where a distillation column is used in the present high boiling point component removal step, a mixture containing fluorenone and low boiling point components are collected from the column top.

(Low Boiling Point Component Removal Step)

Subsequently, it is preferable that low boiling point components be removed.

The distillation temperature in the present step may be appropriately adjusted to about the boiling point of fluorenone under the pressure during distillation (boiling point at 1 atm is 342° C.). For example, in the case where the distillation pressure is adjusted to 1.5 to 3.5 kPa, the distillation temperature is preferably 150 to 300° C., more preferably 160 to 250° C., still more preferably 165 to 230° C., and furthermore preferably 170 to 200° C.

In the case where a distillation column is used in the present low boiling point component removal step, high-purity fluorenone may be collected from the column bottom.

In the case where the residence time at the column bottom is long, fluorenone may be deteriorated and colored. Therefore, in order to remove coloring components, it is preferable that further distillation be performed after the present distillation step (coloring component removal step), so that high-purity fluorenone is collected from the column top.

EXAMPLES

The present invention will be specifically described based on Examples shown below, though the present invention is not limited thereto.

<Method for Measuring Each Component Concentration (Composition)>

The composition of each component (fluorene, fluorenone, 9-fluorenyl acetate and 9,9'-bisfluorenyl) in a reaction product after the oxidation step, the solvent removal step, and the heating step was calculated by an internal reference method using gas chromatography (internal reference: triphenylmethane).

The purity of fluorene and 9-fluorenones (fluorene, fluorenone and 9-fluorenyl acetate (fluorenyl acetate)) after the distillation step is an area percentage by gas chromatography.

The bromide ion concentration was determined by titration using silver nitrate.

As impurities contained in the final collected product, fluorene as starting material and 9-fluorenyl acetate as a main by-product were subjected to quantification. The smaller the amount thereof, the higher the purity of the resulting fluorenone, which is preferable. The results are shown in Table 1.

<Method for Measuring Gardner Color Number>

The Gardner color number in Examples and Comparative Examples was determined by melting purified fluorenone at 140° C. and using a colorimeter.

<Production of Fluorenone>

Example 1

(1. Oxidation Step)

Cobalt acetate tetrahydrate, manganese acetate tetrahydrate, 48 mass % hydrogen bromide aqueous solution, glacial acetic acid, and water were mixed to obtain a catalyst solution having a cobalt metal atom concentration of 0.75 mass %, a manganese metal atom concentration of 0.75 mass %, a bromine ion concentration of 0.075 mass %, an acetic acid concentration of 88.425 mass %, and a water concentration of 10 mass %.

An autoclave made of titanium with an internal volume of 500 mL having a gas discharge pipe with a reflux condenser, a gas blow pipe, a continuous starting material liquid feeding pump and a stirrer was charged with 150 g of the catalyst solution. Under nitrogen atmosphere, the pressure was increased to 1.0 MPa and the temperature was raised to 200° C. In 120 minutes, 150 g of fluorene was supplied thereto. The throughput was 1.3 g/min. Air was introduced at the start of supply of the starting material, and the oxidation reaction was performed by adjusting the amount of air introduced such that the oxygen concentration in the off-gas was 4 vol % or less. After termination of the supply of fluorene, the absorption of oxygen ended, and the introduction of air was terminated when the oxygen concentration in the off-gas reached 8 vol %. After the reaction, the oxidation reaction product was extracted. The amount collected was 310 g (weight collection rate: 99.4%). According to the result of analysis, the composition of the oxidation reaction product containing acetic acid as solvent included 2.64 mass % of fluorene, 41.6 mass % of fluorenone, 2.78 mass % of 9-fluorenyl acetate, and 0.41 mass % of 9,9'-bisfluorenyl.

(2. Solvent Removal Step)

Into a 500-mL flask made of glass, 310 g of the oxidation reaction product was transferred, and simple distillation was performed over 1 hour at a heater temperature of 120° C. and an internal pressure of 5 to 40 kPa, so that 153 g of acetic acid and water were distilled off. The composition of the reaction product after removal of the solvent included 4.76 mass % of fluorene, 79.8 mass % of fluorenone, 5.36 mass % of 9-fluorenyl acetate, and 0.74 mass % of 9,9'-bisfluorenyl.

(3. Heating Step)

The reaction product after removal of the solvent was introduced into a distillation column corresponding to 9 stages, and refluxed under a pressure of 2 kPa at 245.0 to 250.0° C. for 2 hours. The bromide ion concentration in the reaction product used in the present step was 0.075 parts by mass relative to 100 parts by mass of fluorenone. The composition of the reaction product after heating included 2.96 mass % of fluorene, 79.4 mass % of fluorenone, and 2.38 mass % of 9,9'-bisfluorenyl. No 9-fluorenyl acetate was contained therein.

(4. Distillation Step (High Boiling Point Component Removal Step))

After the heating step, using the distillation column used in the heating step, extraction was started under distillation conditions set to a pressure of 2 kPa, a column top temperature of 188.0° C., and a column bottom temperature of 196.0° C. From the distillation column top, 107 g of the resulting fluorenone containing low boiling point components was extracted. The composition included 5.6% of fluorene and 94.4% of fluorenone, and the collection rate of fluorenone by the distillation was 80.0%.

(5. Distillation Step (Low Boiling Point Component Removal Step))

Fluorenone containing low boiling point components obtained from the distillation column top was subjected to batch distillation to separate the low boiling point components from fluorenone using a distillation column corresponding to 9 stages. The distillation conditions were set to a pressure of 1.7 kPa, a column top temperature of 185.0° C., and a column bottom temperature of 190.0° C. Purified fluorenone was obtained from the distillation column bottom. The purity of the resulting purified fluorenone was 99.99%, the collection rate of fluorenone by the distillation was 76.2%, and the Gardner color number was 8.5. Further, the purified fluorenone contained 0.01% of fluorene as starting material and no 9-fluorenyl acetate (detection limit: 0.001% or less).

Example 2

The same operation as in Example 1 was performed up to "3. Heating step". After completion of "3. Heating step", "5.

Distillation step (low boiling point component removal step)" was performed. The fluorenone containing a high boiling point components obtained from the distillation column bottom was subjected to "4. Distillation step (high boiling point component removal step)", so that purified fluorenone was obtained from the distillation column top. The resulting purified fluorenone had a purity of 99.29%, a total yield of 51.1%, and a Gardner color number of 8.2. Further, the purified fluorenone contained 0.68% of fluorene as starting material and no 9-fluorenyl acetate (detection limit: 0.001% or less).

Example 3

The same operation as in Example 1 was performed up to "5. Distillation step (low boiling point component removal step)". After completion of "5. Distillation step (low boiling point component removal step)", the fluorenone obtained from the distillation column bottom was subjected to coloring component removal step (distillation under a pressure of 1.7 kPa at a temperature of 190° C.), so that purified fluorenone was obtained from the distillation column top. The resulting purified fluorenone had a purity of 99.99% and a Gardner color number of 8.2. Further, the purified fluorenone contained 0.01% of fluorene as starting material and no 9-fluorenyl acetate (detection limit: 0.001% or less).

Comparative Example 1

The same operation as in Example 1 was performed up to "2. Solvent removal step", so that a reaction product after removal of solvent was obtained. The reaction product after removal of solvent was introduced into a distillation column corresponding to 9 stages, and subjected to "4. Distillation step (high boiling point component removal step)" and "5. Distillation step (low boiling point component removal step)" in the order indicated in the same manner as in Example 1, without "3. Heating step", so that purified fluorenone was obtained from the distillation column bottom. The resulting purified fluorenone had a purity of 97.16%, a total yield of 46.7%, and a Gardner color number of 8.5. Further, the purified fluorenone contained 0.01% of fluorene as starting material and 2.76% of 9-fluorenyl acetate.

Comparative Example 2

The same operation as in Example 1 was performed up to "1. Oxidation step", so that an oxidation reaction product was obtained. Subsequently, the oxidation reaction product after oxidation reaction was cooled to 30° C. with stirring for precipitation of crude fluorenone. The crystals were separated by a solid-liquid separator, washed with water, and then the crude fluorenone crystals were dried. Twice the amount of 70% aqueous acetic acid solution was added to the resulting crude crystals, heated to 108° C. to redissolve the crude crystals, and then the crude fluorenone solution was cooled to 30° C. for precipitation of purified fluorenone. The crystals were separated with a solid-liquid separator and washed with water. The purified fluorenone was then dried. The resulting purified fluorenone had a purity of 96.10%, a crystal purification yield of 41.4%, and a Gardner color number of 14.7. Further, the purified fluorenone contained 0.20% of fluorene as starting material and 1.00% of 9-fluorenyl acetate.

TABLE 1

|  |  | Example 1 | Example 2 | Example 3 | Comparative Example 1 | Comparative Example 2 |
|---|---|---|---|---|---|---|
| Production condition | Solvent removal step | Simple distillation | Simple distillation | Simple distillation | Simple distillation | — |
|  | Temperature in heating step | 245.0–250.0 | 245.0–250.0 | 245.0–250.0 | (Without heating step) | (Without heating step) |
|  | Purification step | Distillation | Distillation | Distillation | Distillation | Crystal precipitation |
|  | Order of distillation step | High boiling point component removal step → Low boiling point component removal step | Low boiling point component removal step → High boiling point component removal step | High boiling point component removal step → Low boiling point component removal step → Coloring component removal step | High boiling point component removal step → Low boiling point component removal step | — |
| Composition of final collection product | Fluorenone (%) | 99.99 | 99.29 | 99.99 | 97.16 | 96.10 |
|  | Fluorene (starting material) (%) | 0.01 | 0.68 | 0.01 | 0.01 | 0.20 |
|  | Fluorenyl acetate (by-product) (%) | Undetected | Undetected | Undetected | 2.76 | 1.00 |

From the results of Examples and Comparative Examples, it is shown that according to the production method of the present invention, by-products and the like generated by the oxidation reaction can be efficiently removed, so that high-purity fluorenone can be obtained by an industrially advantageous distillation method.

<Production of Fluorenone (Evaluation of Efficiency for Removing by-Products)>

The efficiency for removing by-products associated with changes in conditions of the heating step was evaluated by the following Test Examples.

Test Examples 1 to 9 and Comparative Test Example 1

The same operation as in Example 1 was performed up to "2. Solvent removal step", so that a reaction product after removal of solvent was obtained. The reaction product after removal of solvent was introduced into a distillation column corresponding to 9 stages, and refluxed under a pressure of 2 kPa, at a temperature shown in Table 2 for a time period shown in Table 2 (heating step). In Table 2, the residual amount of 9-fluorenyl acetate as by-product is shown as a ratio to the reaction product after removal of the solvent. The smaller the residual amount of 9-fluorenyl acetate, the better the efficiency for removing by-products. The residual amount of 9-fluorenyl acetate is specifically determined by the following formula.

> Residual amount of 9-fluorenyl acetate (%)=(Residual amount of 9-fluorenyl acetate in reaction product after heating step)/(Residual amount of 9-fluorenyl acetate in reaction product after solvent removal)×100

Comparative Test Example 2

The same operation as in Example 1 was performed up to "1. oxidation step", so that an oxidation reaction product was obtained.

The oxidation reaction product was introduced into a distillation column corresponding to 9 stages, and refluxed under a pressure of 2 kPa for 2 hours (heating step). The heating temperature was about 110° C. due to reflux of acetic acid. In Table 2, the residual amount of 9-fluorenyl acetate as by-product is shown as a ratio to the oxidation reaction product. The residual amount of 9-fluorenyl acetate is specifically determined by the following formula.

> Residual amount of 9-fluorenyl acetate (%)=(Residual amount of 9-fluorenyl acetate in reaction product after heating step)/(Residual amount of 9-fluorenyl acetate in oxidation reaction product)×100

TABLE 2

| | | Comparative Test Example 1 | Test Example 1 | Test Example 2 | Test Example 3 | Test Example 4 | Test Example 5 | Test Example 6 | Test Example 7 | Test Example 8 | Test Example 9 | Comparative Test Example 2 |
|---|---|---|---|---|---|---|---|---|---|---|---|---|
| Test condition | Solvent removal step | Simple distillation | Simple distillation | Simple distillation | Simple distillation | Simple distillation | Simple distillation | Simple distillation | Simple distillation | Simple distillation | Simple distillation | (Without solvent removal step) (Reflux) |
| | Temperature in heating step (° C.) | 110 | 200 | 230 | 260 | 300 | 250 | 250 | 250 | 250 | 250 | |
| | Time for heating step (hour) | 2 | 2 | 2 | 2 | 2 | 0.25 | 0.5 | 0.75 | 1 | 3 | 2 |
| Test result | Residual amount of fluorenyl acetate (by-product) (%) | 100 | 0.8 | 0.0 | 0.0 | 0.0 | 0.0 | 0.0 | 0.0 | 0.0 | 0.0 | 100 |

From the results of Test Examples and Comparative Test Examples, it may be seen that the by-products generated by the oxidation reaction can be efficiently removed by performing the solvent removal step and the heating step of the production method of the present invention.

The invention claimed is:

1. A method for producing fluorenone, comprising:
   oxidizing fluorene in the presence of an aliphatic carboxylic acid having 2 to 3 carbon atoms, a metal catalyst, a bromine compound, and oxygen to obtain an oxidation reaction product;
   removing the aliphatic carboxylic acid from the oxidation reaction product to produce a mixture;
   heating the mixture at a temperature in a range of 120 to 350° C. to obtain a heat-treated mixture; and
   a distilling the heat-treated mixture.

2. The method for producing fluorenone according to claim 1, wherein the heating has a duration of 5 minutes or more.

3. The method for producing fluorenone according to claim 1, wherein the mixture comprises fluorenone and bromide ions, and
   wherein a concentration of the bromide ions in the mixture is 0.01 to 5 parts by mass relative to 100 parts by mass of fluorenone.

4. The method for producing fluorenone according to claim 1, wherein the distilling comprises, in the order indicated, removing a high boiling point component and removing a low boiling point component.

5. The method for producing fluorenone according to claim 1, wherein the metal catalyst is at least one selected from the group consisting of a cobalt catalyst, a manganese catalyst, a zirconium catalyst, a cerium catalyst, and a nickel catalyst.

6. The method for producing fluorenone according to claim 1, wherein the aliphatic carboxylic acid is acetic acid.

7. The method for producing fluorenone according to claim 1, wherein oxygen is supplied by introducing air during the oxidizing.

8. The method for producing fluorenone according to claim 1, wherein the temperature in the heating is in a range of 180 to 350° C.

9. The method for producing fluorenone according to claim 1, wherein the temperature in the heating is in a range of 220 to 350° C.

10. The method for producing fluorenone according to claim 2, wherein the temperature in the heating is in a range of 180 to 350° C.

11. The method for producing fluorenone according to claim 3, wherein the temperature in the heating is in a range of 180 to 350° C.

12. The method for producing fluorenone according to claim 4, wherein the temperature in the heating is in a range of 180 to 350° C.

13. The method for producing fluorenone according to claim 7, wherein the temperature in the heating is in a range of 180 to 350° C.

14. The method for producing fluorenone according to claim 2, wherein the temperature in the heating is in a range of 220 to 350° C.

15. The method for producing fluorenone according to claim 3, wherein the temperature in the heating is in a range of 220 to 350° C.

16. The method for producing fluorenone according to claim 4, wherein the temperature in the heating is in a range of 220 to 350° C.

17. The method for producing fluorenone according to claim 7, wherein the temperature in the heating is in a range of 220 to 350° C.

18. The method for producing fluorenone according to claim 2, wherein the mixture comprises a fluorenone ion and a bromide ion,
   wherein a concentration of the bromide ion in the mixture is 0.01 to 5 parts by mass relative to 100 parts by mass of fluorenone, and
   wherein the temperature in the heating is in a range of 180 to 350° C.

19. The method for producing fluorenone according to claim 18, wherein the distilling comprises, in the order indicated, removing a high boiling point component and removing a low boiling point component.

20. The method for producing fluorenone according to claim 14, wherein the mixture comprises a fluorenone ion and a bromide ion,
   wherein a concentration of the bromide ion in the mixture is 0.01 to 5 parts by mass relative to 100 parts by mass of fluorenone, and
   wherein the distilling comprises, in the order indicated, removing a high boiling point component and removing a low boiling point component.

* * * * *